United States Patent [19]
Hallada et al.

[11] 3,922,202
[45] Nov. 25, 1975

[54] FERMENTATION PROCESS

[75] Inventors: Thomas C. Hallada, Westfield;
Edward Inamine, Rahway; Jerome Birnbaum, Morganville, all of N.J.

[73] Assignee: Merck & Co., Inc., Rahway, N.J.

[22] Filed: Nov. 29, 1974

[21] Appl. No.: 527,993

[52] U.S. Cl. ............................ 195/80 R; 195/80 R
[51] Int. Cl.² ........................................ C12D 9/00
[58] Field of Search .................................. 195/80 R

[56] References Cited
UNITED STATES PATENTS
3,770,590  11/1973  Inamine et al. .................. 195/80 R OTHER PUBLICATIONS
Tetrahedron Letters No. 29, pp. 2911–2914; 1972.

*Primary Examiner*—A. Louis Monacell
*Assistant Examiner*—Robert J. Warden
*Attorney, Agent, or Firm*—James A. Arno; Donald J. Perrella; Rudolph J. Anderson

[57]  ABSTRACT

Increased yields of a mixture of the known and useful antibiotics cephamycin A and B are obtained by the addition of L-lysine or L- or DL-α-aminoadipic acid to fermentation media composed of complex organic or chemically defined nutrients.

16 Claims, No Drawings

FERMENTATION PROCESS

BACKGROUND OF THE INVENTION

The present invention relates to an improved process for the production of cephamycin A and cephamycin B and, in particular, to an improved method for the production of cephamycin A and cephamycin B by fermentation of nutrient media with suitable strains of microorganisms such as, for example, Streptomyces.

Cephamycin A and B are known antibiotics and have been described in a publication by Stapley et al., Antimicrobial Agents and Chemotherapy, Sept. 1972, pp. 122–131, and in a publication by Albers-Schonberg et al., Tetrahedron Letters No. 29, pp. 2911-2914, 1972. Cephamycin A, 7$\beta$-(D-5-amino-5-carboxyvaleramido)-3-($\alpha$- methoxy-p-sulfoxycinnamoyloxymethyl)-7-methoxy-3-cephem-4-carboxylic acid, and cephamycin B, 7$\beta$-(D-5-amino-5-carboxyvaleramido)-3-($\alpha$-methoxy-p-hydroxycinnamoyloxymethyl)-7-methoxy-3-cephem-4-carboxylic acid, have been found to be active in mammalian species, e.g. mice and rats, against a wide spectrum of bacteria, including a number of microorganisms resistant to the cephalosporins and penicillins. This includes activity in vivo against the following gram-negative organisms: *Proteus vulgaris*, *Proteus mirabilis*, *Salmonella pullonum*, *Escherichia coli*, and *Klebsiella pneumoniae* and in vivo activity against the following gram-positive organisms: *Staphylococcus aureus*, *Streptococcus pyogenes*, and *Diplococcus pneumoniae*. Activity against the genus Proteus is particularly high. An especially interesting property of the cephamycins is their unusually high resistance to degradation by $\beta$-lactamase.

Due to the inherent difficulty in separating pure cephamycin A and B from the large quantites of impurities in the fermentation broth, it is of considerable importance to find a way to increase the concentration of the antibiotic relative to the total broth solids.

It is an object of the present invention to provide an improved fermentation process for the production of a mixture of the known and useful antibiotics, cephamycin A and cephamycin B. Another object is to provide an improved method for the production of the antibiotic by fermentation of nutrient media with suitable strains of microorganisms such as, for example, Streptomyces. A further object is to provide a method of increasing the yield of cephamycin A and cephamycin B in the fermentation process. Still another object is to provide a method of increasing the yield of cephamycin A and cephamycin B using relatively inexpensive, readily available chemical additives in the fermentation process. These and other objects of the present invention will become apparent from the following description.

SUMMARY OF THE INVENTION

The present invention provides an improved method for the production of a mixture of the known and useful antibiotics cephamycin A and cephamycin B by the addition of L-lysine, L-$\alpha$-aminoadipic acid or DL-$\alpha$-aminoadipic acid or a mixture thereof to fermentation media composed of complex organic or chemically defined nutrients. The additive is preferable employed in a quantity of from about 0.01% (weight/volume) to about 0.80 % (weight/volume).

DETAILED DESCRIPTION

The antibiotic mixture is produced during the aerobic fermentation of suitable aqueous nutrient media under controlled conditions. Aqueous media such as those employed for the production of other antibiotics are suitable. Such media contain sources of carbon and nitrogen which are assimilable by the microorganism, and inorganic salts. In addition, the fermentation media contain traces of metals necessary for the growth of the microorganism which are commonly supplied as impurities incidental to the other constituents of the medium. In general, carbohydrates such as sugars, for example, sucrose, maltose, fructose lactose, and the like, and starches such as grains, for example, oats and rye, corn starch, corn meal and the like can be used either alone or in combination as sources of assimilable carbon. The exact amount of the carbohydrate source or sources utilized in the medium will depend in part upon the other ingredients. It has been found, however, that an amount of carbohydrate between about 1 and about 6 percent by weight of the medium is sufficient. A single carbon source may be used, or several carbon sources may be combined.

Satisfactory nitrogen sources include myriad proteinaceous materials such as various forms of hydrolysates of casein, soybean meal, corn steep liquor, distillers solubles, yeast products, tomato paste, and the like. The various sources of nitrogen can be used either alone or in combination, and are used in amounts ranging from about 0.2 to about 6 percent by weight of the aqueous medium.

The fermentation is carried out at temperatures ranging from about 20°C. to about 37°C., however, for optimum results, it is preferable to conduct the fermentation at temperatures of from about 22°C. to about 28°C. The pH of the nutrient mediums suitable for growing the Streptomyces cultures and producing the antibiotic should be in the range of from about 6.0 to about 7.5.

Cephamycin A and B are produced during the aerobic fermentation described above by various species of Streptomyces capable of producing said antibiotics as, for example, *S. chartreusis*, *S. cinnamonensis*, *S. fimbriatus*, *S. griseus*, *S. halstedii*, *S. rochei* and *S. viridochromogenes*, and especially by the strains of the foregoing species deposited in the culture collection of the Northern Utilization Research and Development Branch of the U.S. Department of Agriculture at Peoria, Illinois under respective accession numbers NRRL 3975, NRRL 3974, NRRL 3954, NRRL 3851, NRRL 3959, NRRL 3973 and NRRL 3962. Particularly good results are obtained by a subisolate of NRRL 3851 identified as NRRL 3912. Other strains of these species, such as mutants obtained by mutating agents or isolated from nature can also be used.

By "complex organic " media is meant media wherein some of the ingredients are not chemically defined. An example of such media is one consisting of Crescent brand oats, soybean meal, sodium citrate, a defoamer and distillers solubles. By "chemically defined" or "synthetic" media is meant media in which all of the ingredients are chemically defined. An example of such media is one consisting of glucose, potassium acid phosphate, sodium citrate, asparagine, methionine, monosodium glutamate, calcium chloride, magnesium sulfate and ferric sulfate.

The amount of the L-lysine or L- or DL-α-aminoadipic acid needed to stimulate production of the antibiotic is to some extent dependent upon both the culture and the medium employed. An increase in the production of antibiotic mixture has been observed in synthetic or complex organic nutrient media containing from about 0.01 to about 0.80 percent (weight/volume) of any one of the additives or mixtures thereof. Optimum yields are obtained at a level of from about 0.10 to about 0.40 percent with particularly good yields at from about 0.19 to about 0.2 percent.

One skilled in the art will readily appreciate that in addition to being used singly, the L-lysine, or L-α-aminoadipic acid or DL-α-aminoadipic acid may be combined to afford an additive that will stimulate the yield of cephamycin A and B in both complex organic nutrient media and synthetic media employing a strain of Streptomyces capable of producing cephamycin A and cephamycin B.

One skilled in the art will further appreciate that in addition to employing L-lysine, salts of L-lysine may be utilized in the practice of the invention. For example, the —HCl, —$SO_4$, —$PO_4$, etc. salts may be employed in the basal production medium to increase the yield of antibiotic.

While the yield-increasing additives may be added to the fermentation batch at the time of inoculation with the Streptomyces culture to as long as 72 hours subsequent thereto, in general, better yields are obtained when its addition is delayed about 20 to about 30 hours after inoculation.

Although the mixture of cephamycin A and cephamycin B may be produced by both surface and submerged cultures, it is presently preferred to carry out the fermentation in the submerged state. Small scale fermentations are conveniently carried out by placing suitable quantities of nutrient medium in flasks, loosely stoppering the necks of the flasks with cotton, sterilizing the flasks and contents by heating to about 120°C., inoculating the flasks with either spores or a vegetative cellular growth of a cephamycin A and B producing strain of Streptomyces, and permitting the fermentation to proceed at a constant temperature of about 25°C. for about 2–5 days. For larger scale work, it is preferable to conduct the fermentation in suitable tanks provided with an agitator and a means for aerating the fermentation medium. In this method, the nutrient medium is made up in the tank and sterilized by heating at about 120°C. After cooling the sterilized medium is inoculated with a suitable source of vegetative cellular growth of the Streptomyces culture and the fermentation is permitted to proceed for several days while agitating and/or aerating the nutrient medium and maintaining the temperature at about 25°C. This method of producing cephamycin A and B is particularly suited for the preparation of large quantities of the antibiotic.

In carrying out the invention, a cell suspension is prepared by the addition of sterile medium to an agar slant culture of the cephamycin A and B producing microorganism. Growth from the slant culture is then used to inoculate a seed flask and the seed flask is shaken at about 25°C. for 1–3 days in order to obtain good growth. The seed flask is then used to inoculate the production flasks. Alternatively, the seed flask can be inoculated from a lyophilized culture or a frozen inoculum.

The inoculation is generally carried out using about 1 ml. per 40 ml. of production medium. The desired concentration of additive is then added to the production flasks after the necessary time period of waiting and the fermentation is permitted to proceed for 2–4 days while agitating and/or aerating the nutrient medium and maintaining the temperature at about 25°C. All of the production flasks, i.e., those containing additives and the flasks used as controls, are then assayed in conventional manner, generally after 96 hours, to determine the amount of antibiotic produced in each flask.

The antibiotic can be recovered from the fermentation medium by a number of procedures. The filtered broth can be passed through one or more ion exchange columns. The amphoteric nature of the antibiotic enables selection of both cationic and anionic ion exchange resin to optimize recovery. The absorbed antibiotic can then be removed by elution, preferably in a volatile solvent such as pyridine which can be easily removed.

The following examples illustrate the present invention without, however, limiting the same thereto.

EXAMPLE 1

Agar Medium:

A lyophilized tube of Streptomyces griseus NRRL 3912 was opened aseptically, the contents diluted with 2 ml. of sterile saline and transferred to the surface of an agar maintenance medium of the following composition:

| | |
|---|---|
| V-8 juice (Campbell) | 10 % v/v |
| Soybean meal, 4S, (Staleys) | 2 % w/v |
| glucose | 0.2% w/v |
| agar (Difco) | |
| Distilled water | to 1000 ml |

The pH was adjusted to 7.8 –8.0 with NaOH. The agar medium was placed in tubes or larger bottles (Blakes) and autoclaved for 20 minutes at 121°C. After cooling the surface of the agar was inoculated and incubated at 25°C. for 7 days, after which luxuriant growth was apparent.

Seed Medium:

A loopful of the growth from the agar maintenance medium was aseptically transferred to 250 ml. baffled Erlenmeyer flask containing 50 ml. of the following medium:

| | |
|---|---|
| Ardamine Yeast Autolysate (YEP) (Yeast Prod. Co., Paterson, N.J) | 1% w/v |
| glucose | 1% |
| $MgSO_4.7H_2O$ | 0.005% |
| $KH_2PO_4$ | 0.0182% |
| $Na_2HPO_4$ | 0.019% |

The medium was prepared with deionized water and adjusted to pH 6.5 with NaOH. The medium was sterilized by autoclaving at 121°C. for 20 minutes. After cooling, followed by inoculation, the flask was incubated on a rotary shaker (220 rpm, 2 inch displacement) at 25°C. for 48 hours.

Basal Production Medium I:

Three (3.0) ml. of the fermented seed was used to inoculate 40 ml. of basal production medium contained in 250 ml. Erlenmeyer flasks. The basal medium had the following composition:

| | |
|---|---|
| Corn steep liquor (wet) | 40 g. |
| glucose | 20 g. |
| NaCl | 2.5 g. |
| MgSO$_4$.7H$_2$O | 0.5 g. |
| Polyglycol 2000 defoamer | 0.10 v/v |
| Deionized water | to 1000 ml. |

The medium was adjusted to pH 7.0 with sodium hydroxide, dispensed (40 ml.) into 250 ml. Erlenmeyer flask covered with cotton and autoclaved for 20 minutes at 121°C. After cooling, to some of flasks containing basal production medium there was added small amounts of a filter sterilized concentrated solution of L-lysine-HCl that had been adjusted to pH 7.0 with NaOH. Different volumes of the neutralized L-lysine.HCl solution were added in order to obtain various levels of L-lysine.HCl in the medium. After inoculation the flasks were incubated for three days on a rotary shaker at 25°C.

Assays:

After the fermentation was complete, the cells were removed by centrifugation after the whole broth had been adjusted to pH 5.0 with H$_3$PO$_4$. The clarified broth was diluted with phosphate buffer pH 5.0. The concentration of the antibiotic mixture was determined by the disc assay method with the assay organism, *Proteus vulgaris* ATCC 21,100, with partially purified mixture of cephamycin A and B serving as standard. The standard was assigned an arbitrary unit value; i.e. 1 unit was equal to the amount of material necessary to give a zone of inhibition of 25 mm. against the assay organism. The productivity of the fermentation is reported in Table 1.

TABLE 1

| Ingredient Added to Basal Production Medium I | Cephamycin A and B Produced (units/ml.) |
|---|---|
| None | 427 |
| L-lysine·HCl, 0.05% | 546 |
| L-lysine·HCl, 0.10% | 562 |

EXAMPLE 2

The productivity of cephamycin A and B was improved further by preparing a modified basal production medium (II). The new medium increased the productivity by about five fold. This enhanced productivity, however, could be improved even further by the addition of a yield — increasing additive according to the present invention.

Basal Production Medium II:

Three (3.0) ml. of the fermented seed prepared as described in Example 1 was used to inoculate 40 ml. of production medium which contained the following ingredients:

| | |
|---|---|
| Corn steep liquor (wet) | 40 g. |
| Cerelose (commercial dextrose) | 40 g. |
| Proflo Cottonseed Meal (Traders Protein, Ft. Worth, Texas | 9 g. |
| Polyglycol 2000 defoamer | 0.1% v/v |
| Tap water | to 1000 ml. |

The medium was prepared with tap (city) water and adjusted to pH 6.6 with NaOH. Forty ml. was dispensed into 250 ml. Erlenmeyer flasks and sterilized by autoclaving for 20 minutes. To one set of flasks containing basal production medium was added various volumes of filter sterilized, concentrated solutions of L-lysine.HCl that had been adjusted to pH 7.0 with NaOH, in order to give different final volumes of L-lysine in the production medium. After inoculation, the flasks were incubated on a rotary shaker at 25°C. for 3 days, after which they were assayed as described in Example 1 for antibiotic production. The productivity of the fermentation in units/ml of cephamycin A and B produced is reported in Table 2.

TABLE 2

| Expt. No. | % L-Lysine·HCl Added to Basal Production Medium II | | | |
|---|---|---|---|---|
| | None | 0.05 | 0.10 | 0.20 |
| 1 | 1417 | 1573 | 1666 | 1622 |
| 2 | 1572 | 1397 | 1487 | 2022 |
| 3 | 1762 | | 2590 | 2462 |
| 4 | 1787 | | 1950 | 2325 |
| 5 | 2018 | | 2730 | 2632 |
| 6 | 2480 | | 2938 (3006) | |
| 7 | 2178 | | | 2794 (2984) |
| 8 | 2601 | (3173) | 3341 (3598) | 3260 (3728) |
| 9 | 2118 | | | 3125 |
| 10 | 1716 | | | 2474 (2916) |
| 11 | 1830 | | | 2373 |
| 12 | 1763 | | 2240 | 2520 |
| 13 | 1836 | | 2080 | 2850 |

Data in parenthesis are for antibiotic production when the addition of L-lysine HCl was delayed 24 hours post-inoculation. All other data are for fermentations receiving L-lysine HCl just immediately prior to inoculation.

The data show that 0.1–0.2% L-lysine stimulates antibiotic production even when its addition is delayed 24 hours after inoculation. In general, the results are superior when the addition of the amino acid is delayed.

EXAMPLE 3

The procedure of Example 2 was repeated except that several levels of DL-α-aminoadipic acid were added in place of L-lysine.HCl to the basal production medium II. The results are shown in Table 3.

TABLE 3

| Expt. No. | Ingredient Added to Basal Production Medium II | Cephamycin A & B Produced (Units/ml.) |
|---|---|---|
| 1 | None | 1417 |
| | DL-α-aminoadipic acid 0.05% | 1644 |
| | 0.1 % | 1703 |
| | 0.2 % | 1804 |
| 2 | None | 1572 |
| | DL-α-aminoadipic acid 0.05% | 1440 |
| | 0.1 % | 1985 |

EXAMPLE 4

The procedure of Example 3 is repeated except that L-α-aminoadipic acid is substituted for DL-α-aminoadipic acid. Similar increases in productivity of cephamycin A and cephamycin B are obtained.

Any departure from the above description which conforms to the present invention is intended to be included within the scope of the claims.

What is claimed is:

1. In the process for preparing cephamycin A and cephamycin B by growing a cephamycin A and cephamycin B producing specie of Streptomcyes in a nutrient medium, the improvement which comprises the addition of L-lysine, L-α-aminoadipic acid or DL-α-aminoadipic acid to the nutrient medium.

2. The process of claim 1 wherein the Streptomyces specie is selected from the group consisting of *Streptomyces chartreusis, Streptomyces cinnamonensis, Streptmyces fimbriatus, Streptomyces griseus, Streptomyces halstedii, Streptomyces rochei,* and *Streptomyces viridochromogenes.*

3. The process of claim 2 wherein the nutrient medium is synthetic.

4. The process of claim 2 wherein the L-lysine, L-α-aminoadipic acid or DL-α-aminoadipic acid is added in the amount of from about 0.01 to about 0.80 percent (weight/volume) of the synthetic media.

5. The process of claim 4 wherein the organism is *Streptomyces griseus.*

6. The process of claim 4 wherein the additive is L-lysine.

7. The process of claim 4 wherein the additive is L-α-aminoadipic acid.

8. The process of claim 4 wherein the additive is DL-α-aminoadipic acid.

9. The process of claim 4 wherein the additive is added to the nutrient medium at from about 20 to about 30 hours after inoculation.

10. The process of claim 2 wherein the nutrient medium is a complex organic nutrient medium.

11. The process of claim 10 wherein the L-lysine or L-α-aminoadipic or DL-α-aminoadipic acid is added in the amount of from about 0.01 to about 0.80 percent (weight/volume) of the complex organic nutrient media.

12. The process of claim 11 wherein the organism is *Streptomyces griseus.*

13. The process of claim 11 wherein the additive is L-lysine.

14. The process of claim 11 wherein the additive is L-α-aminoadipic acid.

15. The process of claim 11 wherein the additive is DL-α-aminoadipic acid.

16. The process of claim 11 wherein the additive is added to the nutrient medium at from about 20 to about 30 hours after inoculation.

* * * * *